(12) United States Patent
Moduga et al.

(10) Patent No.: US 8,370,229 B2
(45) Date of Patent: Feb. 5, 2013

(54) EVERGREEN CONTRACT BILLING AND IN LIFE CONTRACT MANAGEMENT SYSTEM AND METHOD

(75) Inventors: Sridhar Moduga, Hyderabad (IN); Chandra Anupam, Schaumburg, IL (US); Prashant Gunjikar, Schaumburg, IL (US); Samir Singh, Stamford, CT (US); Uday Kumar, Danbury, CT (US)

(73) Assignee: Genpact Limited, Hamilton (BM)

( * ) Notice: Subject to any disclaimer, the term of this patent is extended or adjusted under 35 U.S.C. 154(b) by 1120 days.

(21) Appl. No.: 11/799,927

(22) Filed: May 2, 2007

(65) Prior Publication Data
US 2008/0275798 A1 Nov. 6, 2008

(51) Int. Cl.
G07F 19/00 (2006.01)
H04M 15/00 (2006.01)
(52) U.S. Cl. .......................................... 705/34; 705/307
(58) Field of Classification Search ................ 705/7, 35, 705/36, 40, 59; 709/223
See application file for complete search history.

(56) References Cited

U.S. PATENT DOCUMENTS

| | | | | |
|---|---|---|---|---|
| 6,192,347 | B1 * | 2/2001 | Graff | 705/36 R |
| 2002/0147680 | A1 * | 10/2002 | Cho et al. | 705/40 |
| 2006/0009999 | A1 * | 1/2006 | Gee et al. | 705/1 |

OTHER PUBLICATIONS

Research Note: A Dynamic Programming Approach to Customer Relationship Pricing, Michael Lewis, Management Science Jun. 2005 vol. 51 No. 6 986-994.*

* cited by examiner

*Primary Examiner* — Matthew Gart
*Assistant Examiner* — Rokib Masud
(74) *Attorney, Agent, or Firm* — Kenyon & Kenyon LLP

(57) ABSTRACT

The present invention provides an improved billing and contract management method and a computerized enterprise resource management system for processing and management of rent-producing financial products, such as contracts and leases that are past the initial end term date, and that have not been renegotiated or extended, or, in other words, that have entered the "evergreen" period. Among other things, the method and computerized system of the present invention integrate processing of the "evergreen" contracts with a proprietary generalized ERP software product/solution such as Oracle™ E-Business suite's Lease Management system, and supplement the processing of regular contracts with the "evergreen" contract authoring and booking, processing, validation, billing, accounting, collections, modification and audit trailing of the changes made to the "evergreen" contract terms.

25 Claims, 5 Drawing Sheets

EVERGREEN CONTRACT BILLING AND IN LIFE CONTRACT MANAGEMENT SYSTEM AND METHOD

COPYRIGHT

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND

The present invention relates generally to an improved billing and contract management method and a computerized system, and more specifically to software and a method for providing additional billing and management functionality and processing of rent-producing financial products, such as contracts and leases that are past the initial end term date and that have not been renegotiated or extended, or, in other words, that have entered the "evergreen" period. In particular, the present invention relates to the software that provides and incorporates the processing of the financial products (e.g., operating, direct finance, asset sales and sales type leases and loans) in the "evergreen" period with proprietary software products such as Oracle™ E-Business suite's Lease Management system and allows seamless integration with Oracle and other software contract management products and methods.

In today's competitive technological marketplace, computerized systems and proprietary software (a.k.a. an enterprise resource planning (ERP) applications) are used to track and manage a number of different financial and asset-based products, such as commercial leases and other types of rent-generating contracts. Most ERP systems track and manage only a limited aspect of a business agreement or a particular type of transaction, but some offer a more global approach, allowing a user to track the contractual arrangement and business transactions pursuant to this arrangement from sales and contract origination to the end term of the contractual agreement.

For example, Oracle™ Lease Management system and solution helps lessors manage a number of complex contractual business arrangements, such as vendor programs, operating agreements, investor agreements and other types of contracts with sufficient automation and flexibility necessary for operations in a global enterprise marketplace. Among other things, it helps lessors to account for transactions according to standards that may vary from one region to another, comply with evolving regulations, streamline and automate end-to-end business process to improve efficiencies and reduce costs by reducing traditionally labor-intensive processes such as contract authoring, review and approval, management of the transactions in multiple currencies, billing, funding, collections, insurance and contract termination.

Although Oracle's E-business suite's Lease Management software provides an improvement over prior lease management software products and ERPs that were specific to the requirements of a particular country and did not interface with other similar systems selected by the affiliates in other countries, Oracle's unified software solution and method for automating the end-to-end business processes is still deficient in a number of important aspects. It only has extremely limited functionality relating to automated processing, billing and accounting for the contracts in the "evergreen" period. The lease contract period for these contracts may have reached its term date, but the rents are still being collected and the contract is neither renegotiated, extended, or rebooked. Therefore, there exists a need for, among other goals and solutions, for a software system and a method of processing the "evergreen" contracts and integrating their processing with such contract management functions as authoring and booking, processing, billing, accounting, collections, modification of the terms and conditions and audit trailing of these modification in the ERP systems currently utilized by lessors.

DETAILED DESCRIPTION

One aspect of the evergreen lease management system includes resolves missing functionalities or computational shortcomings of existing enterprise resource planning systems. For example, one such ERP system having evergreen shortcomings may be the Oracle E-business suite's Lease Management software, but may also applicable to other ERPs by incorporating certain additional processes and software components into the generalized ERP software and method. It also addresses the need to incorporate the "evergreen" solution and processing into the centralized ERP system (such as Oracle Lease Management software) as independent modular components that do not interfere with, integrate easily with and operate together with other processes and components of a centralized ERP system. The term "centralized" in this case refers to unified functionality and all aspects of operations for a multinational enterprise. Physically, such a system could be implemented on a standalone computer processor with memory and an input device, as well as over a distributed network or even multiple networks.

Another aspect of the present invention is to permit customization and modifications to certain components of the automated solution and methodology utilized for the "evergreen" contract processing, billing, accounting, collections, audit and modification in a centralized ERP system.

These and other objects, features and advantages of the present invention, its integration and operation within a centralized ERP system such as Oracle Lease Management software, as well as other ERPs, will be best understood from the following detailed description of the embodiments of the present invention, taken in conjunction with the accompanying drawings.

Generally, administrative costs are among the top categories of expenditures for an asset-based finance company. Leasing companies and enterprises reduce the labor intensive processes associated with, for example, contract authoring, billing and collections by streamlining their operations, defining financial products with standard contract terms that generate certain expected accounting results, auditing schemes and collections. The Oracle E-Business Suite provides a centralized ERP that enables leasing companies to efficiently finance and loan products, manage customer and vendor relationships, bill and collect payment, disburse funds to vendors and investors, track and account for assets and products, define such aspects of a business as "customers," "vendors," "suppliers," "employees" and "financial products." The process and system incorporating the "evergreen" contract processing with the centralized ERP, such as Oracle E-Business Suite, is shown with reference to FIGS. 1 through 5.

Figure 1:
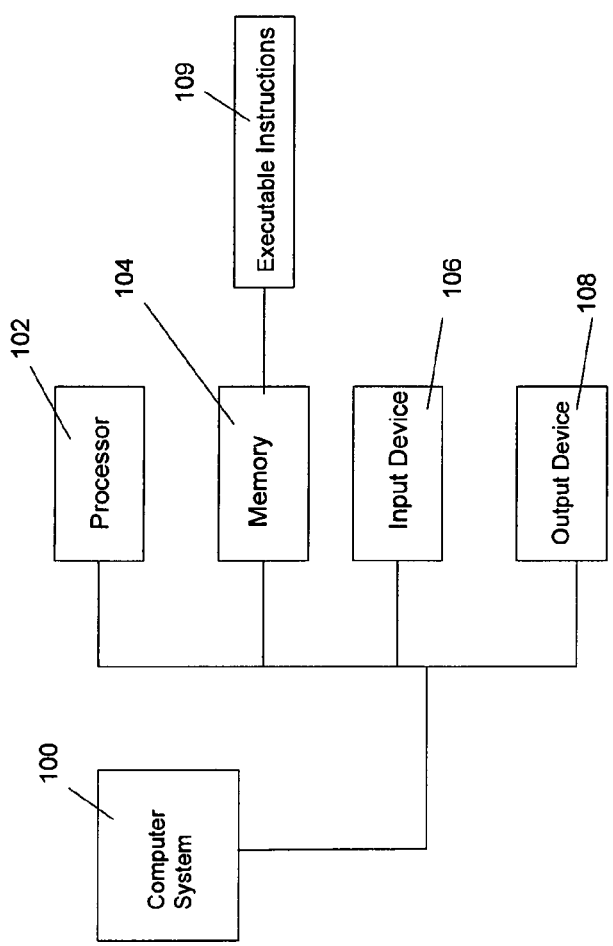
FIG. 1 illustrates a generalized computer environment for implementing and incorporating the "evergreen" contract processing functionality within an ERP software solution for an enterprise.

FIG. 1 illustrates a computer system 100 that includes a processor 102, a memory 104, an input device 106, e.g., a keyboard or a computer mouse and an output device 108, e.g., a computer screen or a printer. The memory 104 stores executable instructions 109. The processor 102, upon receipt of the executable instructions 109, is operative to perform various processing operations for implementing the management of the financial products with added "evergreen" contract processing in accordance, as discussed later. The processor 102 may consist of one or more processing devices centrally or remotely disposed in a processing environment, and the memory 104 may be any suitable type of memory operative to store and provide the executable instructions 109 to the processor, where the memory 104 may be remote to the processor 102, or, in another embodiment, may be internally disposed within the processor 102 or within a computing environment having the processor 102 incorporated or connected therein.

Figure 2:
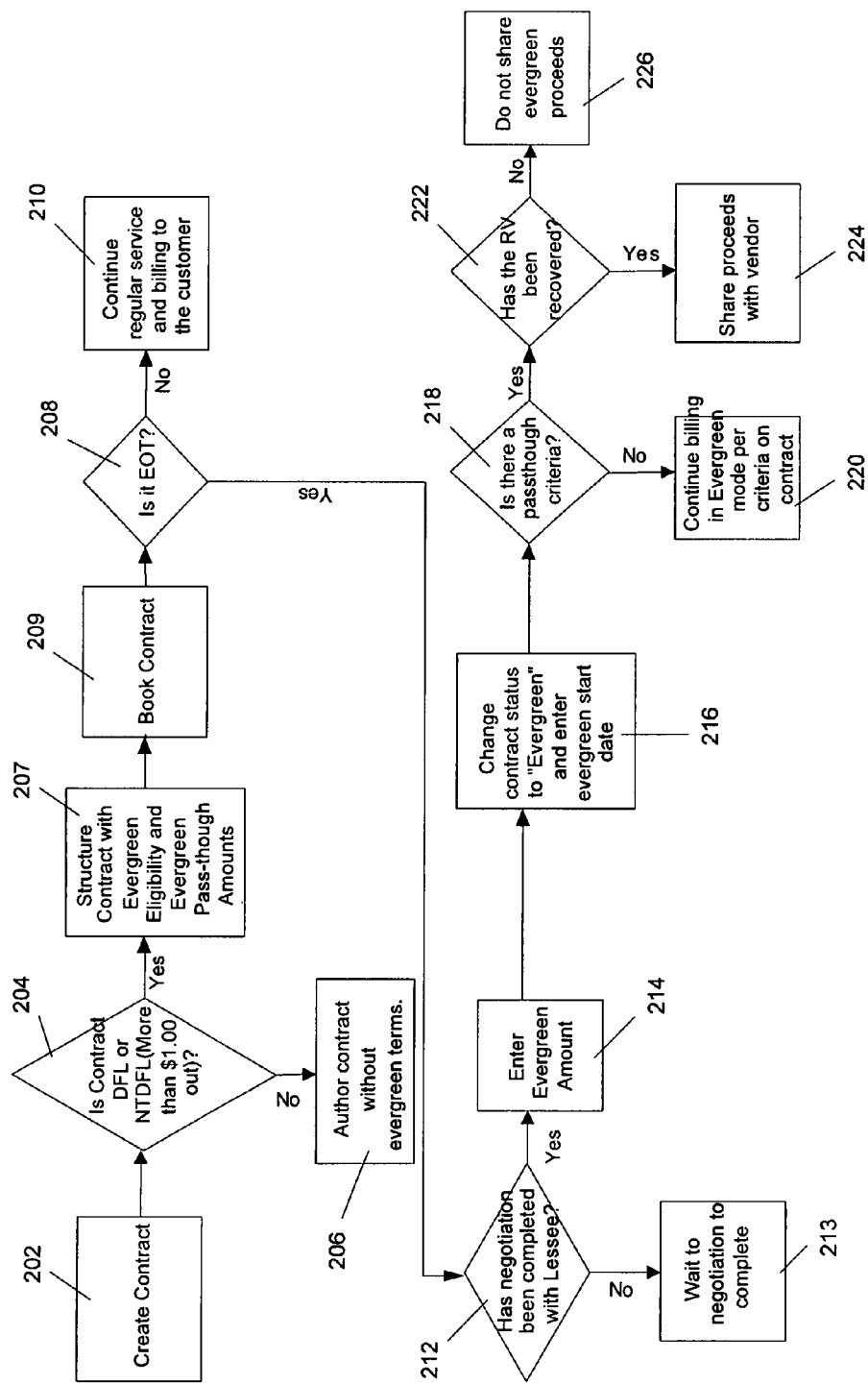
FIG. 2 shows a flow chart of the logical process in which the "evergreen" contract processing is incorporated into the ERP software and process for managing, billing and collecting rents from a regular term contract.

FIG. 2 is a logical flow chart of a process for creating, integrating and implementing the "evergreen" contract processing and functionality with the ERP software and process for authoring/creating, managing, billing and collecting rents from a regular term contract. The contract, which includes both the regular term and the "evergreen" contract, is "created" at step 202. In the next step 204, it is determined whether the contract is DFL or non-DF, i.e. if is it is Evergreen eligible. If not, the contract is authored and processed without "evergreen" terms at step 206; otherwise the contract is booked 209 and processed with "Evergreen" Eligibility 207 to determine at step 208 whether it is at the end of its term (EOT). The contract that has not reached its term, i.e., has not reached the "evergreen" status, is then serviced and billed to the customer at step 210. If, however, the contract has reached its term, the next step 212 is to determine whether negotiations have been completed. If so, then the evergreen amount is entered, contract status is changed to "evergreen," and the evergreen start date is entered, as shown in steps 214 and 216 of FIG. 2. Otherwise, if negotiations have not completed, the processing awaits the completion of those negotiations, as shown in 213. The next step 218 determines whether the evergreen proceeds should be shared with a vendor (i.e., whether there is a "pass-through" criterion for sharing the rent proceeds). If not, the billing is continued in the "evergreen" mode, subject to the terms of the contract in step 220. If rent proceeds are to be shared, and the rent value (RV) has been recovered, as determined in step 222, the proceeds are shared with the vendor, as indicated in step 224. When no rent value has been recovered, there is no sharing of the evergreen proceeds, as indicated in step 226.

Figure 3:
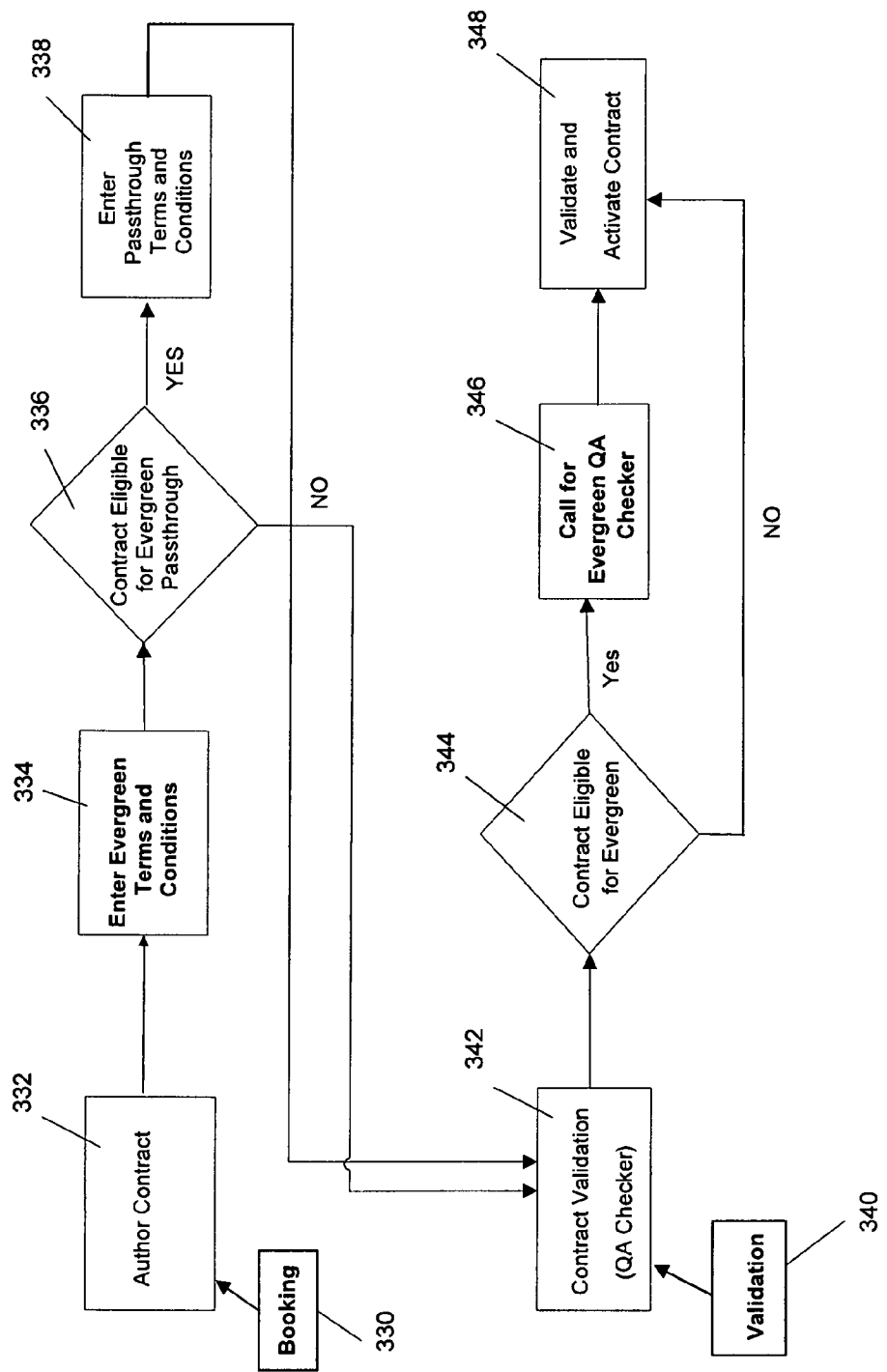
FIG. 3 shows a flow chart and the logical components and processes that are added to the logical components of an ERP in order to implement and integrate the "evergreen" contract functionality with the regular term contract authoring and validation.

FIG. 3 is a flow chart that illustrates a particular embodiment for implementing and integrating "evergreen" processes within a generalized ERP system, and further illustrates the logical components that are added to the logical components of an ERP system in order to implement and integrate the "evergreen" contract functionality with the regular term contract authoring and validation. The process of booking a contract, 330 begins with "authoring" the contract in step 332. Then, in step 334, the "evergreen" terms and conditions are entered. This allows to address situations where the "evergreen" billing frequency and amount are different from the normal term period for the contract that entered the "evergreen" period. It may also be possible to set up terms and conditions as to bill for the "evergreen" rent only, and not for the "evergreen" services. Also, it may be necessary or desirable to send a notice to the customer when the contract changes its status to "evergreen" and the terms change with that change in status. In step 336, it is determined whether the regular contract is eligible for the "evergreen" pass-through at the end of its term, and, if so, the terms and conditions for the pass-through are entered in step 338. Then, both types of contracts, those that are eligible for the "evergreen" pass-through and those that are not, are subjected to the validation process 340, which could be implemented using a QA checker that validates regular contracts as well as those in "evergreen" status. As part of the validation process 340, the processor 102 executes computer instructions to perform the regular contract validation procedure in step 342. Then, it is determined in step 344 whether the contract is eligible for "evergreen" status, and, if so, a separate call 346 to the "evergreen"-specific QA checker is made. When the contract at issue is not eligible for the "evergreen" status, the call to the "evergreen"-specific QA checker is bypassed. In one embodiment of the system in accordance with the current invention, the "evergreen"-specific QA checker is added to the software code for a QA checker used to validate regular contracts. Alternatively, it could be implemented in a separate procedure and code segment. Once the "evergreen"-specific QA checker step has completed, the contract is validated and activated, as indicated in step 348.

Figure 4:
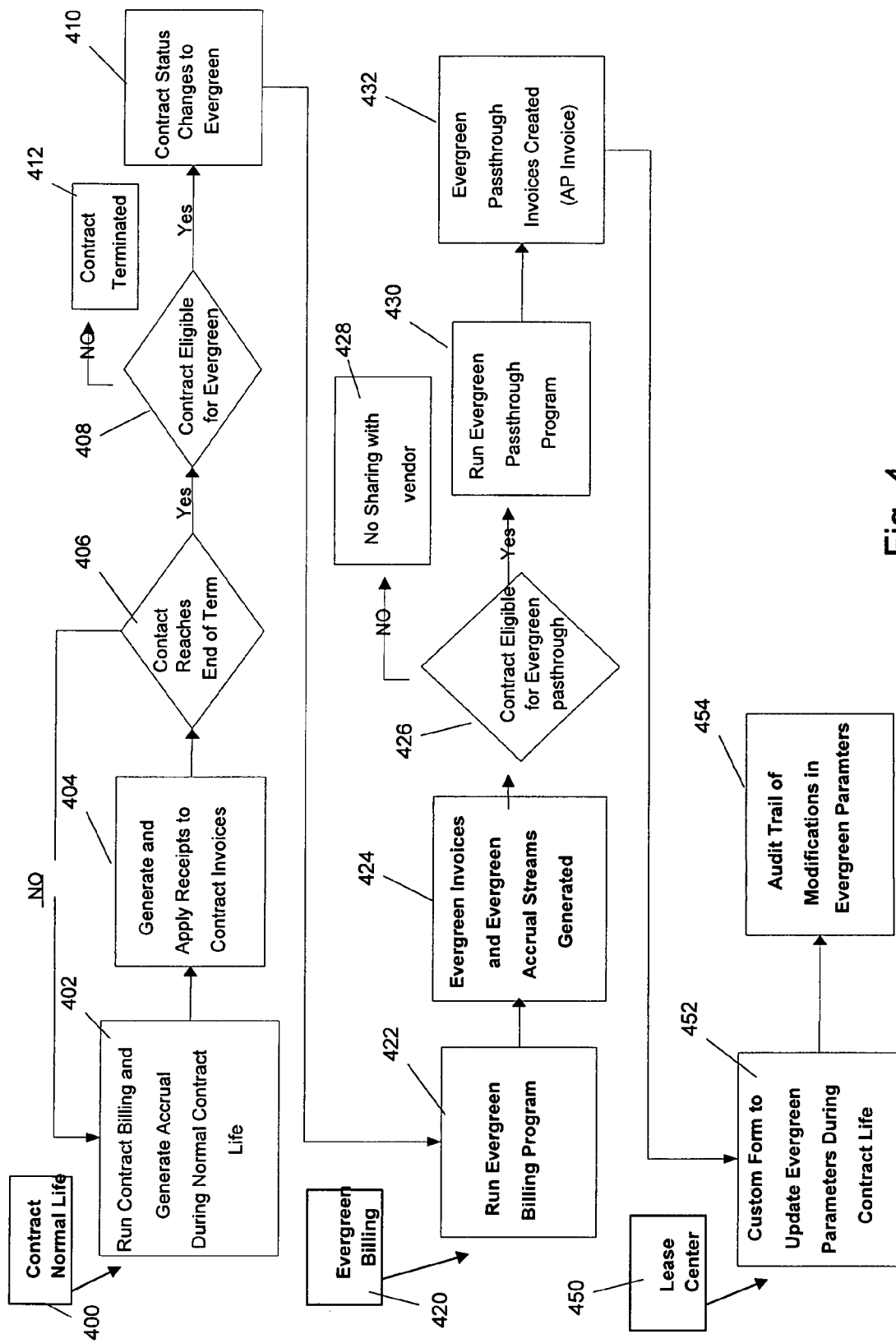
FIG. 4 shows a flow chart and the logical components and processes that are added to the logical components of an ERP in order to implement and integrate the "evergreen" contract functionality with the regular term contract billing, in-life management components and lease center functions.

FIG. 4 further illustrates the flow chart and logical components that are added to the logical components of an ERP system in order to implement and integrate the "evergreen" contract in-life management functions such as billing, form updates and audit trailing of the modifications to the "evergreen" terms and conditions. The contract normal life billing functions 400 begin by performing the code for regular contract billing and generating accrual during the life of the contract at step 402. It then generates and applies receipts to contract invoices in step 404 until the contract reaches the end of its term. When it is determined in step 406 that a contract has reached the end of its term, it is then determined in step 408 whether this contract is eligible for "evergreen" status, and, if so, changes the status of the contract to "evergreen" in step 410. The contract that has reached the end of its term but is not eligible for "evergreen" status is simply terminated, as shown in step 412.

Referring to FIG. 4, those contracts that change their status to "evergreen" are subject to "evergreen" billing 420 by causing the processor 102 to execute computer instructions for the "evergreen" specific billing programs, as indicated in step 422 and generating "evergreen" accrual streams and invoices for revenue recognition in step 424. When it is determined in step 426 that the contract is not eligible for the "evergreen"

pass-through, the accrued rents or revenue are not shared with the vendor, as indicated in step 428. Otherwise, the "evergreen" pass-through program or code is called and executed in step 430 and the "evergreen" pass-through invoices are generated as part of the step 432. As also illustrated in FIG. 4, the lease center function 450 is preferably modified to contain custom screen forms to update "evergreen" parameters during the contract life cycle and also create an audit trail of the modifications of the "evergreen parameters," as indicated respectively in steps 452 and 454.

Figure 5:
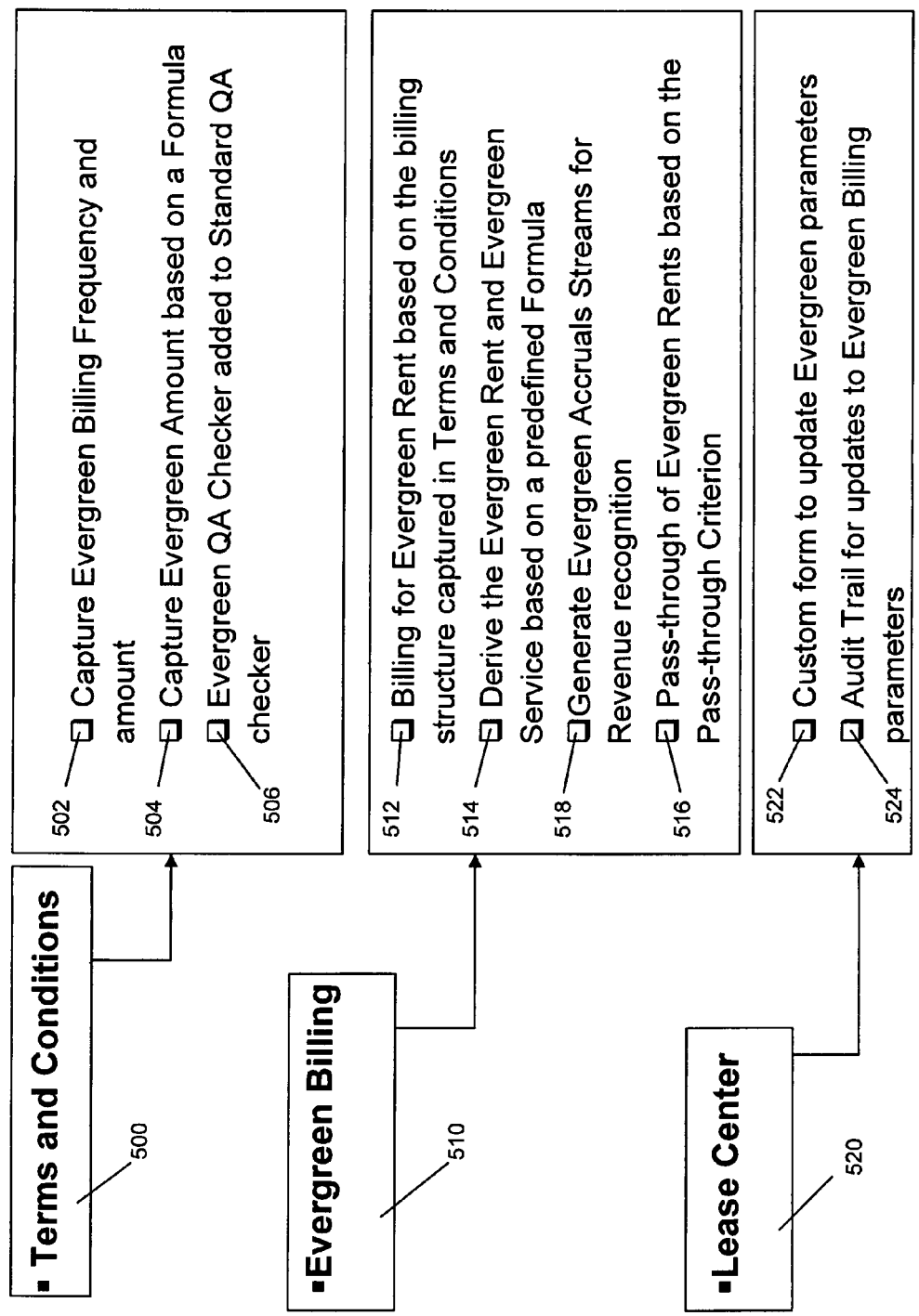
FIG. 5 illustrates how the additional logical components that implement "evergreen" processing are incorporated and integrated within the standard contract solution components of a centralized ERP system.

FIG. 5 shows a table that illustrates how the logical components that add processing and management of the "evergreen" contracts are integrated with the logical and functional components of a generalized ERP system. As discussed in connection with FIG. 2, the steps for capturing the "evergreen" billing frequency and amount 502, capturing "evergreen" amount for a contract based on a particular formula, as shown in 504, and additional "evergreen" QA Checker 506 are incorporated with the Terms and Conditions logical component 500 of a generalized ERP system. Similarly, the "evergreen" billing 510 process, which includes without limitation billing the "evergreen" rent and service 512 based on the billing structure captured in the Terms and Conditions logical component or based on a particular formula, as shown in 514, the "evergreen" revenue pass-through logical component 516, the step of generating accrual streams 518 and creating invoices for revenue recognition are incorporated with the Contract Normal Life Billing function 400 of the standard contract billing process. The custom forms to update the "evergreen parameters" 522 and the audit trail 524 for the updates to the "evergreen" billing parameters are incorporated as part of the Lease Center logical component 520 of a generalized ERP.

Although the preceding text sets forth a detailed description of various embodiments, it should be understood that the legal scope of the invention is defined by the words of the claims set forth below. The detailed description provided herein is to be construed as exemplary only and does not describe every possible embodiment of the invention because describing every possible embodiment would be impractical, if not impossible. It should also be noted that the sequence or arrangement of the particular steps shown in various figures accompanying the description of the embodiments of the current invention is not limiting, and it is understood that rearranging these described steps is within the scope of the contemplated invention. Numerous alternative embodiments could also be implemented, using either current technology or technology developed after the filing date of this patent, which would still fall within the scope of the claims defining the invention.

It should be understood that there exist implementations of other variations and modifications of the invention and its various aspects, as may be readily apparent to those of ordinary skill in the art, and that the invention is not limited by specific embodiments described herein. It is therefore contemplated to cover any and all modifications, variations or equivalents that fall within the scope of the basic underlying principles disclosed and claimed herein.

What is claimed is:

1. A method for processing a contract involving one or more rent-producing financial products, wherein the contract has entered the evergreen term, the method comprising the steps of:
   determining whether the contract is past its initial end term date, and has not been renegotiated or extended;
   authoring and booking the contract with one or more evergreen terms and conditions;
   changing the status of the contract to indicate that it has entered the evergreen term;
   determining using a computer processor whether the contract is eligible for a pass-through of the evergreen proceeds to at least one third party;
   determining using a computer processor whether any rent proceeds were collected on the contract in the evergreen status;
   sharing of the rent proceeds collected on the contract in the evergreen status; and
   billing to the customer based on the evergreen terms, wherein at least one of those evergreen terms is different from the corresponding regular contract term before the contract reached the end of its term and entered the evergreen status;
   wherein the evergreen billing frequency and amount terms are different from the corresponding regular contract terms before the contract reached the end of its term and entered the evergreen status.

2. The method of claim 1 further comprising the steps of:
   authoring and booking a contract without the evergreen terms if it is determined that the contract has not entered the evergreen status; and
   billing to the customer based on the regular contract terms when the contract has not reached the end of its term.

3. The method of claim 1, wherein the billing for the evergreen rent is based on the billing terms and conditions entered when the contract is authored and booked.

4. The method of claim 1, wherein the billing for the evergreen rent or evergreen service is based on a predefined formula.

5. The method of claim 1 further comprising the step of:
   generating the evergreen invoices and the evergreen accrual streams as part of the evergreen billing; and
   notifying the customer before the contract changes its status to indicate that it has entered the evergreen term.

6. The method of claim 1 further comprising the step of:
   validating the eligibility of the contract for the evergreen status prior to the contract activation and performance of the billing function.

7. The method of claim 1, wherein the rent proceeds collected on the contract in the evergreen status are shared at least in part with the vendor.

8. The method of claim 1 further comprising the step of:
   accounting for the sharing of the rent proceeds collected on the contract in the evergreen status.

9. The method of claim 1 further comprising the steps of:
   modifying at least one of the evergreen contract terms or conditions during the evergreen contract life term; and
   creating an audit trail of the modifications to the evergreen contract terms or conditions made during the evergreen contract life term.

10. The method of claim 9, wherein the step of modifying the evergreen contract terms is performed using at least one custom form for updating the evergreen terms or conditions during the evergreen contract life term.

11. An apparatus for processing a contract involving one or more rent-producing financial products, the apparatus comprising:
   a memory for storing a plurality of executable instructions; and
   a processor coupled to receive the executable instructions from the memory such that the processor, in response to the executable instructions, is operative to:
      process information related to the contract involving one or more rent-producing financial products;
      determine whether the contract is past its initial end term date, and has not been renegotiated or extended;
      provide for the authoring and booking of the contract with one or more evergreen terms and conditions;
      provide for the change in status of the contract to indicate that it has entered the evergreen term;

determine whether the contract is eligible for a passthrough of the evergreen proceeds to at least one third party;
determine whether any rent proceeds were collected on the contract in the evergreen status;
determine that at least part of the rent proceeds collected on the contract in the evergreen are to be shared with at least one third party;
perform the billing of a customer based on the evergreen terms, wherein at least one of those evergreen terms is different from the corresponding regular contract term before the contract reached the end of its term and entered the evergreen status;
perform the authoring and booking of a contract without the evergreen terms if it is determined that the contract has not entered the evergreen status; and
perform the billing of a customer based on the regular contract terms when the contract has not reached the end of its term;
wherein the evergreen billing frequency and amount terms are different from the corresponding regular contract terms before the contract reached the end of its term and entered the evergreen status.

12. The apparatus of claim 11, wherein the billing for the evergreen rent is based on the billing terms and conditions entered when the contract is authored and booked.

13. The apparatus of claim 11, wherein the billing for he evergreen rent or evergreen service is based on a predefined formula.

14. The apparatus of claim 11, wherein the processor, in response to the executable instructions, is further operative to:
generate the evergreen invoices and the evergreen accrual streams as part of the evergreen billing; and
notify the customer before the contract changes its status to indicate that it has entered the evergreen term.

15. The apparatus of claim 11, wherein the processor, in response to the executable instructions, is further operative to:
validate the eligibility of the contract for the evergreen status prior to the contract activation and performance of the billing function.

16. The apparatus of claim 11, wherein the rent proceeds collected on the contract in the evergreen status are shared at least in part with the vendor.

17. The apparatus of claim 11, wherein the processor, in response to the executable instructions, is further operative to:
account for the sharing of the rent proceeds collected on the contract in the evergreen status;
modify at least one of the evergreen contract terms or conditions during the evergreen contract life term; and
create an audit trail of the modifications to the evergreen contract terms or conditions made during the evergreen contract life term.

18. The apparatus of claim 11, wherein the modification of the evergreen contract terms is accomplished using at least one custom form for updating the evergreen terms or conditions during the evergreen contract life term.

19. The apparatus of claim 11 further comprising:
an input device for inputting information related to the contract involving one or more rent-producing financial products; and
an output device for outputting information related to a contract that is eligible for or have entered the evergreen term, and for outputting the terms and conditions for that evergreen term.

20. A computerized system for processing a contract involving one or more rent-producing financial products as part of the generalized ERP application operating on such computerized system, the computerized system comprising:
a computer memory for storing a plurality of executable instructions;
a generalized ERP application stored in the memory as part of the executable instructions; and
a computer processor configured to receive the executable instructions from the computer memory and, in response to the executable instruction, operable to:
process information related to the contract involving one or more rent-producing financial products;
determine whether the contract is past its initial end term date, and has not been renegotiated or extended;
provide for the authoring and booking of the contract with one or more evergreen terms and conditions;
provide for the change in status of the contract to indicate that it has entered the evergreen term;
determine whether the contract is eligible for a passthrough of the evergreen proceeds to at least one third party;
determine whether any rent proceeds were collected on the contract in the evergreen status;
determine that at least part of the rent proceeds collected on the contract in the evergreen are to be shared with at least one third party;
perform the billing of a customer based on the evergreen terms, wherein at least one of those evergreen terms is different from the corresponding regular contract term before the contract reached the end of its term and entered the evergreen status;
wherein the evergreen billing frequency and amount terms are different from the corresponding regular contract terms before the contract reached the end of its term and entered the evergreen status.

21. The apparatus of claim 20, wherein the computer processor, in response to the executable instructions, is further operable to:
generate the evergreen invoices and the evergreen accrual streams as part of the evergreen billing; and
notify the customer before the contract changes its status to indicate that it has entered the evergreen term.

22. The apparatus of claim 20, wherein the computer processor, in response to the executable instructions, is further operable to:
validate the eligibility of the contract for the evergreen status prior to the contract activation and performance of the billing function.

23. The apparatus of claim 20, wherein the computer processor, in response to the executable instructions, is further operable to:
account for the sharing of the rent proceeds collected on the contract in the evergreen status.

24. The apparatus of claim 20, wherein the computer processor, in response to the executable instructions, is further operable to:
modify at least one of the evergreen contract terms of conditions during the evergreen contract life term; and
create an audit trail of the modifications to the evergreen contract terms or conditions made during the evergreen contract life term.

25. The apparatus of claim 20, further comprising
an input device for inputting information related to the contract involving one or more rent-producing financial products; and
an output device for outputting information related to a contract that is eligible for or have entered the evergreen term, and for outputting the terms and conditions for that evergreen term.

* * * * *